United States Patent
Correale, Jr. et al.

(10) Patent No.: US 7,904,847 B2
(45) Date of Patent: Mar. 8, 2011

(54) CMOS CIRCUIT LEAKAGE CURRENT CALCULATOR

(75) Inventors: Anthony Correale, Jr., Raleigh, NC (US); Nishith Rohatgi, Raleigh, NC (US); Benjamin John Bowers, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 343 days.

(21) Appl. No.: 12/032,745

(22) Filed: Feb. 18, 2008

(65) Prior Publication Data

US 2009/0210831 A1 Aug. 20, 2009

(51) Int. Cl.
G06F 17/50 (2006.01)
H03K 17/693 (2006.01)
H03K 19/00 (2006.01)
H03K 3/00 (2006.01)
H03K 3/356 (2006.01)

(52) U.S. Cl. ........ 716/5; 716/1; 716/2; 716/4; 716/8; 716/16; 716/17; 327/199; 327/200; 327/210

(58) Field of Classification Search .......... 716/1, 2, 716/4, 8, 16, 17; 257/349, 547; 326/31–36; 327/199, 200, 210, 333
See application file for complete search history.

(56) References Cited

U.S. PATENT DOCUMENTS

| | | | | |
|---|---|---|---|---|
| 5,321,354 A * | 6/1994 | Ooshima et al. | 324/765 |
| 5,600,578 A * | 2/1997 | Fang et al. | 703/14 |
| 6,288,586 B1 * | 9/2001 | Ahn et al. | 327/199 |
| 6,301,692 B1 * | 10/2001 | Kumashiro et al. | 716/10 |
| 6,567,773 B1 * | 5/2003 | Rahmat et al. | 703/14 |
| 6,718,524 B1 * | 4/2004 | Mbouombouo | 716/4 |
| 6,762,638 B2 * | 7/2004 | Correale et al. | 327/202 |
| 6,833,747 B2 * | 12/2004 | Correale | 327/333 |
| 6,896,408 B2 * | 5/2005 | Tokunaga | 374/178 |
| 6,928,635 B2 * | 8/2005 | Pramanik et al. | 716/21 |
| 6,946,875 B2 * | 9/2005 | Yamamoto et al. | 326/50 |
| 7,080,341 B2 * | 7/2006 | Eisenstadt et al. | 716/13 |
| 7,082,374 B2 | 7/2006 | Ranta | 702/60 |
| 7,188,266 B1 * | 3/2007 | Mendel et al. | 713/320 |
| 7,216,310 B2 * | 5/2007 | Chatterjee et al. | 716/2 |
| 7,279,926 B2 * | 10/2007 | Severson et al. | 326/33 |
| 7,328,413 B2 * | 2/2008 | Kim et al. | 716/1 |
| 7,340,712 B2 * | 3/2008 | Correale | 716/17 |
| 7,500,207 B2 * | 3/2009 | Bhattacharya et al. | 716/4 |
| 7,624,361 B2 * | 11/2009 | Watanabe | 716/2 |
| 2005/0117050 A1 | 6/2005 | Jiang | 348/372 |
| 2006/0058994 A1 | 3/2006 | Ravi et al. | 703/23 |
| 2006/0277509 A1 | 12/2006 | Tung et al. | 716/5 |
| 2008/0010626 A1 * | 1/2008 | Correale | 716/17 |
| 2009/0210848 A1 * | 8/2009 | Cox | 716/12 |

* cited by examiner

Primary Examiner — Helen Rossoshek
(74) Attorney, Agent, or Firm — Thomas E. Tyson

(57) ABSTRACT

This invention provides a method for determining leakage current in a CMOS circuit having several devices. It includes the steps of reading a netlist which describes the circuit and includes information on both these devices in the circuit and how these devices are interconnected. Next, an input signal state data file is generated which provides all of the possible input states for the circuit. A determination is made of which devices in the circuit are in an OFF state for each of the input signal states provided. Then the leakage current for each of these devices in the OFF state is computed for each of the input signal states.

18 Claims, 7 Drawing Sheets

| Node Voltage | Device Circuit Positions | Leakage Factor |
|---|---|---|
| 1.0 | OFF,OFF,OFF,OFF | 0.045 |
| 0.9 | OFF,OFF,OFF | 0.071 |
| 1.0 | OFF,OFF,ON,OFF | 0.050 |
| 1.0 | OFF,ON,OFF,OFF | 0.055 |
| 1.0 | OFF,OFF,OFF | 0.066 |
| 0.8 | OFF,OFF | 0.125 |
| 0.9 | OFF,ON,OFF | 0.110 |
| 0.9 | OFF,OFF | 0.127 |
| 1.0 | OFF,ON,ON,OFF | 0.092 |
| 1.0 | OFF,ON,OFF | 0.108 |
| 1.0 | OFF,OFF | 0.125 |
| 0.7 | OFF | 0.710 |
| 0.8 | OFF | 0.729 |
| 0.9 | OFF | 0.764 |
| 1.0 | OFF | 1.00 |

Figure 6

```
VIM_VERSION 18.0
PRTDEF NAND2 DEVICE NAND2
NET Z
NET PW
NET NW
NET GND
NET symNet35
NET VDD
NET A
NET B
PPIN A I A
PPIN B I B
PPIN Z O Z
PPIN PW B PW
PPIN NW B NW
PPIN GND B GND
PPIN VDD B VDD
USGDEF TNA nfet m=1 l=0.08u w=0.42u
UPIN B I PW
UPIN G I A
UPIN D B Z
UPIN S B symNet35
USGDEF TNB nfet m=1 l=0.08u w=0.42u
UPIN B I PW
UPIN G I B
UPIN S B GND
UPIN D B symNet35
USGDEF TPA pfet m=1 l=0.08u w=0.42u
UPIN B I NW
UPIN G I A
UPIN D B Z
UPIN S B VDD
USGDEF TPB pfet m=1 l=0.08u w=0.42u
UPIN B I NW
UPIN G I B
UPIN D B Z
UPIN S B VDD
```

CMOS CIRCUIT LEAKAGE CURRENT CALCULATOR

BACKGROUND OF THE INVENTION

1. Technical Field

The present invention relates in general to a method and computer program product for determining circuit leakage current. In particular, the present invention relates to a method and computer program product for determining the leakage current in CMOS circuit elements.

2. Description of the Related Art

Power consumption in electronic circuits has historically been a major concern and a significant design consideration. Modern designs address this concern by using CMOS (complementary-symmetry metal-oxide-semiconductor) devices in digital logic circuits. A recent trend to increase performance of these CMOS devices is to manufacture them with lower threshold voltages (lower switching voltages). These lower voltage threshold devices are termed low-Vt (LVT) devices and the regular voltage threshold devices are termed regular-Vt (RVT) devices. In order to increase CMOS logic circuit performance, low-Vt (LVT) devices have been substituted for regular-Vt (RVT) devices. In recent technologies, performance gains of approximately 30% have been seen. In past designs, entire chips or large groups of circuits used LVT devices. Unfortunately, the increased performance is offset by increased static power dissipation due to increased leakage current or ($I_{off}$). In one CMOS process, the $I_{off}$ for an LVT device has been determined to be approximately 40 times larger than that of a RVT device. Trends in microprocessors show that the power dissipation due to leakage current will actually be higher than the power consumed by switching current in future technology generations.

In order to maximize the performance of circuits without increasing $I_{off}$ by a factor of 40, applications of LVT devices should be made judiciously. With a carefully designed library that mixes RVT and LVT devices within the same circuit, nearly all of the performance of an all LVT approach may be gained with only ⅕ to ½ of the leakage delta between the two approaches. This circuit style, termed hybrid-Vt, is used to speed up certain transitions to provide a partial speed up of all performance critical transitions.

What is needed, therefore, is a method that quickly determines circuit leakage current to assist the designer in the choice and placement of LVT and RVT devices.

SUMMARY

In accordance with the present invention, a method is provided for determining leakage current in a CMOS circuit having several devices. This method includes the steps of reading a netlist data file containing information on each of the several devices and their respective connections within the circuit, reading input state data where each input state data entry specifies the input signals that are provided to the circuit for that input state, determining which devices in the circuit are in an OFF state for each of the several input states, computing leakage current for each device in the OFF state according to the device position in the circuit for each of the several input states, and providing a resulting leakage calculation for each input state.

In a preferred embodiment of the present invention, the netlist information describing the circuit devices and their interconnections also includes information about the device type and the device characteristics including at least information on the device threshold voltage. In addition, another aspect of the preferred embodiment provides that the input signal data includes leading factors that specify the frequency of occurrence of these input signals.

Also, in accordance with present invention, a computer program product stored in a computer operable media is provided where the computer operable media includes instructions for execution by a computer which when executed by the computer calls the computer to implement a method for determining leakage current in a CMOS circuit having a plurality of devices and the method including the steps of reading a netlist data file containing information on each of the several devices and their respective connections within the circuit, reading input state data where each input state data entry specifies the input signals that are provided to the circuit for that input state, determining which devices in the circuit are in an OFF state for each of the several input states, computing leakage current for each device in the OFF state according to the device position in the circuit for each of the several input states, and providing a resulting leakage calculation for each input state.

BRIEF DESCRIPTION OF THE DRAWINGS

The present invention may be better understood, and its numerous objects, features, and advantages made apparent to those skilled in the art by referencing the accompanying drawings.

FIG. 3 is a chart illustrating an example netlist file for a two input NAND gate;

FIG. 6 is a chart illustrating a Leakage Factor Lookup Table; and

DETAILED DESCRIPTION

The following is intended to provide a detailed description of an example of the invention and should not be taken to be limiting of the invention itself. Rather, any number of variations may fall within the scope of the invention, which is defined in the claims following the description.

The present invention is a method and computer program product that determines leakage current in a CMOS circuit. As discussed previously, the use of low voltage threshold CMOS devices (LVT) has increased in order to improve circuit performance. However, these low-voltage threshold devices (LVT) also exhibit high leakage current characteristics. Therefore, in order to maximize performance of CMOS circuits without increasing the power loss due to leakage current, circuits are designed with both regular voltage threshold devices (RVT) and LVT devices.

For a simple example, if a designer selected a two input NAND gate and desires to substitute LVT devices for certain RVT devices, the designer must determine the circuit location of the specific devices to substitute. To do so, the designer should consider the possible states of the circuit and analyze the circuit accordingly. In this example (see NAND circuit in FIG. 7A), there are four transistors resulting in $2^4$ possible variations of LVT and RVT devices. Two factors that must be considered are circuit delays, which are usually determined by computer simulation, and circuit leakage current.

Figure 1:
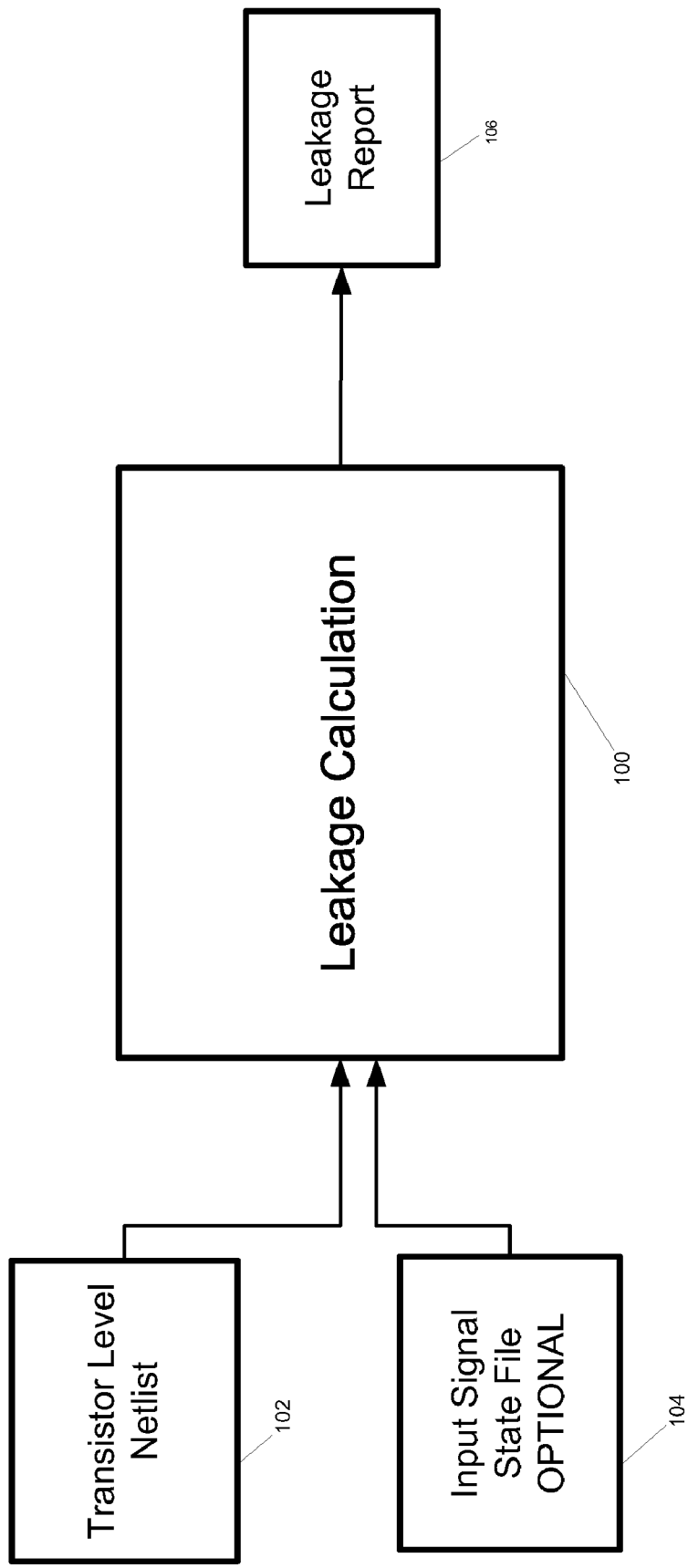
FIG. 1 is a block diagram illustrating the leakage calculation method with its input information and output report.

The present invention may be used to determine the circuit leakage current. FIG. 1 is a block diagram illustrating the present invention. The two inputs to block 100 are the transistor level netlist 102 and the input signal state file 104. The netlist is a description of the circuit being analyzed that includes information on the circuit devices and their interconnections. An example of a netlist file is illustrated in FIG. 3. The input signal state file 104 is shown in FIG. 1 as being optional. That is because, in the preferred embodiment of the invention, the invention includes the capability to generate all of the input signal state data or input vectors for the circuit under analysis. However, if an input state data file is provided, it can include weight data to reflect the frequency of occurrence for each of the possible input signal states. For the example of a NAND gate, there are 4 different input combinations for input signals A and B that can be applied to the circuit. This is illustrated in Table 1 showing that each input combination has the same occurrence frequency or weight.

TABLE 1

| Input State Weight in percentage | Input A | Input B | Circuit Output |
|---|---|---|---|
| 25% | 0 | 0 | 1 |
| 25% | 0 | 1 | 1 |
| 25% | 1 | 0 | 1 |
| 25% | 1 | 1 | 0 |

However, due to other factors, all of these input signals sets may not be provided to a circuit so the circuit should not be analyzed for such input signal sets. Additionally, different weighting factors may need to be considered when applying these input signal sets in order to get a more realistic leakage current computation. Therefore, in the preferred embodiment, the invention includes the capability to receive an input signal state file 104 that may include a more realistic representation of the expected input data and this file is then used as the input signal data in the circuit analysis.

The analysis process labeled in FIG. 1 as the leakage calculation block 100 determines the leakage current for each of the devices in the CMOS circuit for each of the input signal states. All of the device leakage current data for all of the input signal states is provided as a leakage report 106.

Figure 2:
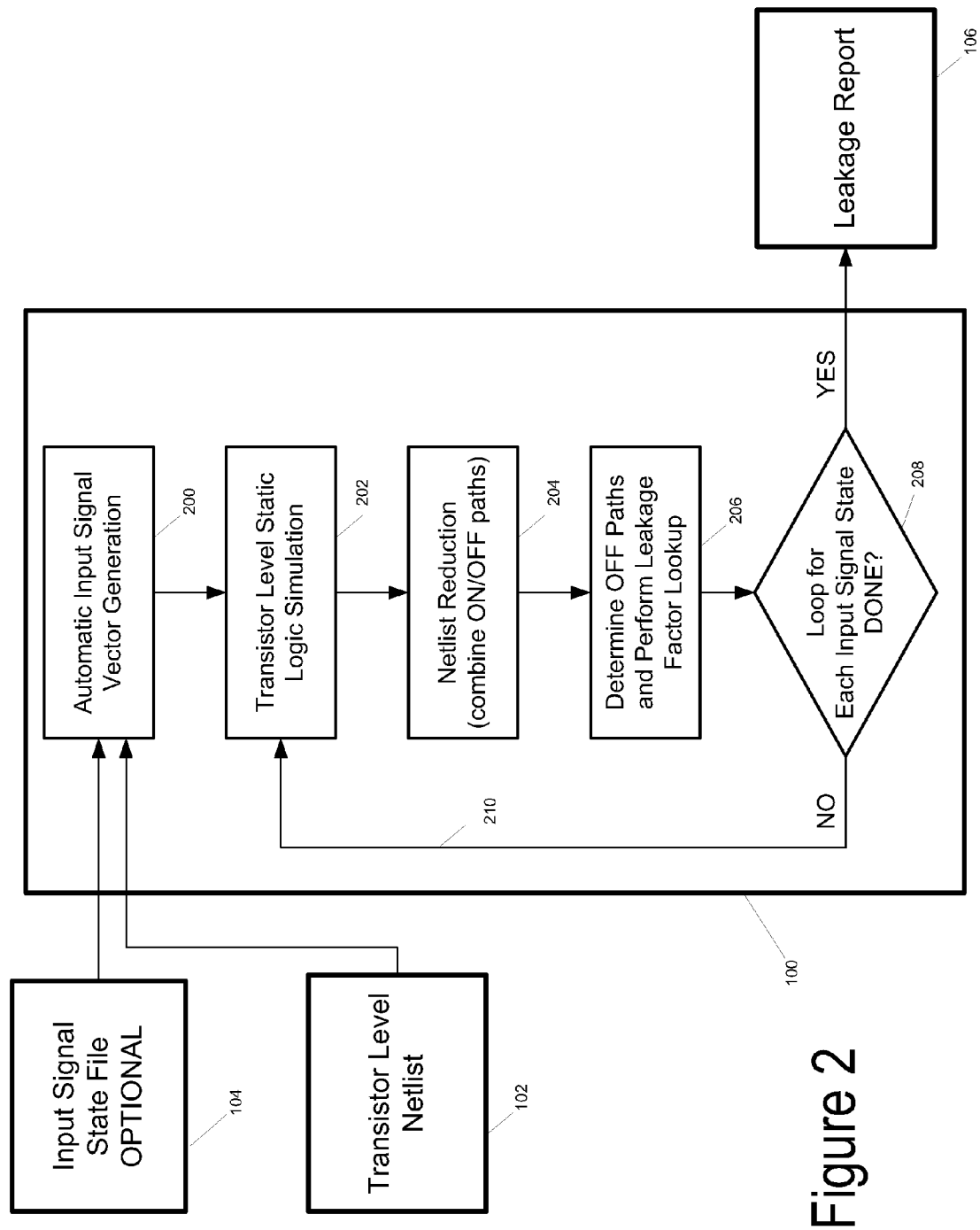
FIG. 2 is a flowchart illustrating the functional flow for the leakage current calculations.

FIG. 2 illustrates, in flowchart form, the leakage calculation process in block 100. Shown, as in FIG. 1, are the transistor level netlist block 102 (i.e., example in FIG. 3) and the input signal state file block 104 as inputs to the process in block 100. Likewise the output report of leakage data for each input state is the leakage report block 106. In FIG. 2, the program block 100 includes a first step 200 that receives the inputs from the transistor level netlist and the input signal state file. However, as previously discussed, if the input signal state file is not provided, the input signal states are automatically generated in step 200. Obtaining the input signal states is the initial stage of the circuit analysis.

Next, in step 202, a transistor level static logic simulation is performed using the transistor level netlist and the input signal state data provided. The transistor level static logic simulation is shown in more detail in FIG. 3. The FIG. 3 illustrated netlist of a NAND-2 contains a listing of all nets which are inputs A & B, output Z, Nwell, Pwell, GND, VDD, and an intermediate node, symNet35 which is node-C in FIG. 7 series. Also included in the netlist are the Pin definitions. Lastly, the netlist contains the device definitions and their associated connections. For example, device TNA, is defined as an nfet, having a channel width of 0.42 um, a channel length of 0.08 um, and is a single device as is signified by the m=1 term. The gate (G) is connected to input-A, the drain (D) is connected to the output Z, the source (S) connected to symNet35, and the bulk or body (B) is connected to the PW net. Referring to FIG. 7A, we see this device 504. The results of the simulation in step 202 is provided to the netlist reduction process in step 204 which reduces the number of circuit paths by determining the paths with devices in an ON state and the paths with devices in an OFF state. If a path includes devices that are all in an ON state, the path is not analyzed since for device leakage calculations, device leakage only occurs when a device is in an OFF state. Then, in step 206, the process determines for paths with devices in the OFF state, what the leakage current is for each of the devices. This is done by reference to a Leakage Factor Lookup Table such as one illustrated in FIG. 6. Upon completion of the leakage factor lookup for each of the OFF state device paths in step 206, the process determines in step 208 if each input signal state has been analyzed and, if not, the process loops back via line 210 to the transistor level static logic simulation in step 202 to continue with the next input signal state. Once all of the signal states have been analyzed, the leakage data is provided as a leakage report in block 106.

Figure 4:
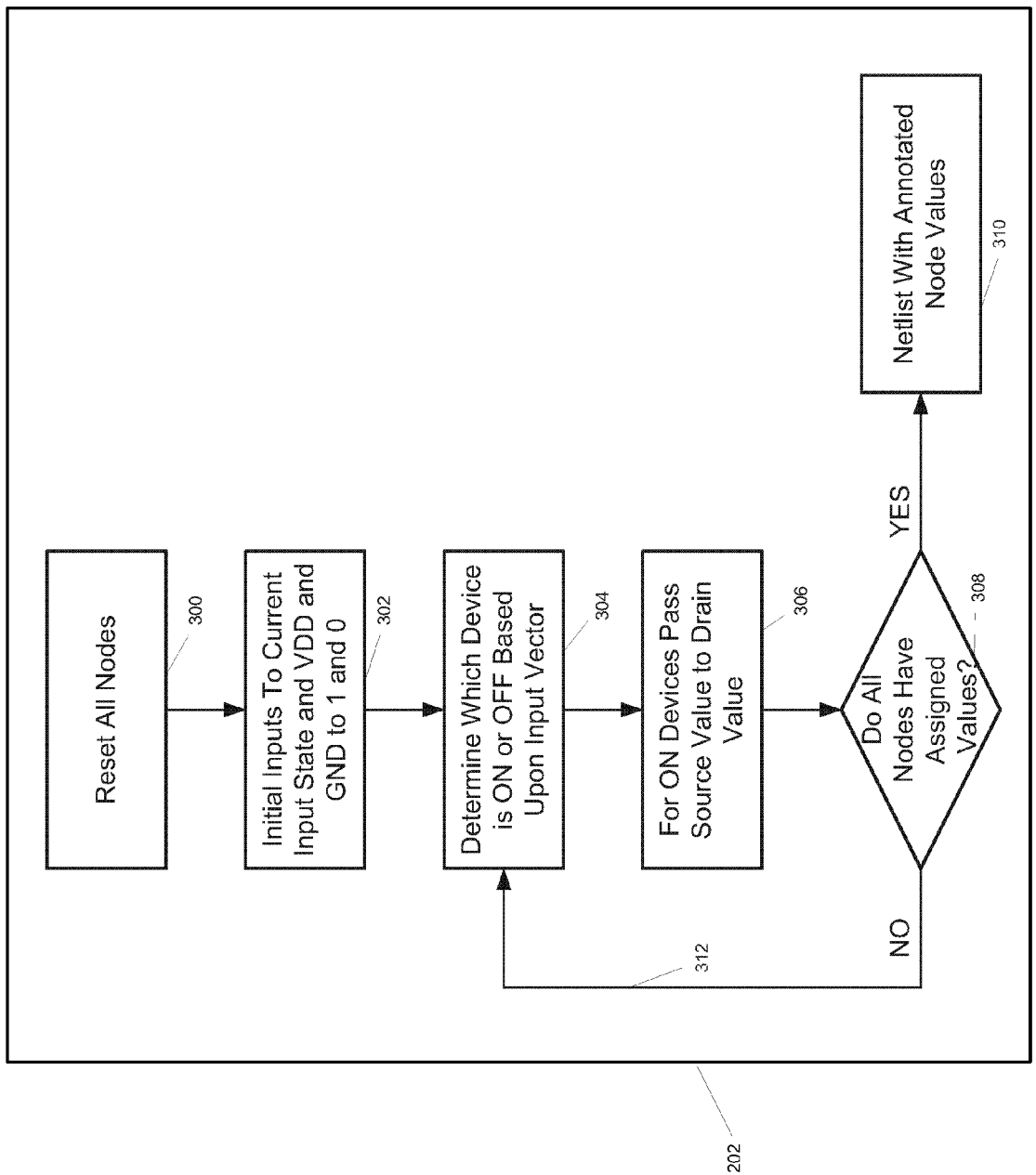
FIG. 4 is a flow chart depicting the transistor level static logic simulation process.

FIG. 4 illustrates the internal process of the transistor level static logic simulation step 202. In the first step, all nodes are reset to a neutral signal level in step 300 (a numeric value of −1 in the preferred embodiment). Then, in step 302, all of the input nodes are set to the values defined in the current input signal state and the VDD supply voltage nodes are set to 1 and the ground GND nodes are set to 0. However, in the preferred embodiment, multiple VDD supply voltage values may be specified by the netlist, and these specified values would then be assigned to their respective VDD supply voltage nodes. Likewise, if multiple ground node potential values have been specified by the netlist, then those values would be assigned to their respective ground nodes. Next, the input signals are propagated through the devices to determine which devices are in an ON state and which devices are in an OFF state. In step 306, for all devices in an ON state, the source node value is passed to the drain node. Then, in step 308, a check is made that all nodes have assigned values. If not, the process loops back via line 312 and renews step 304. If all nodes have been assigned values, then the process exits to step 310 to provide the netlist with annotated node values.

Figure 5:
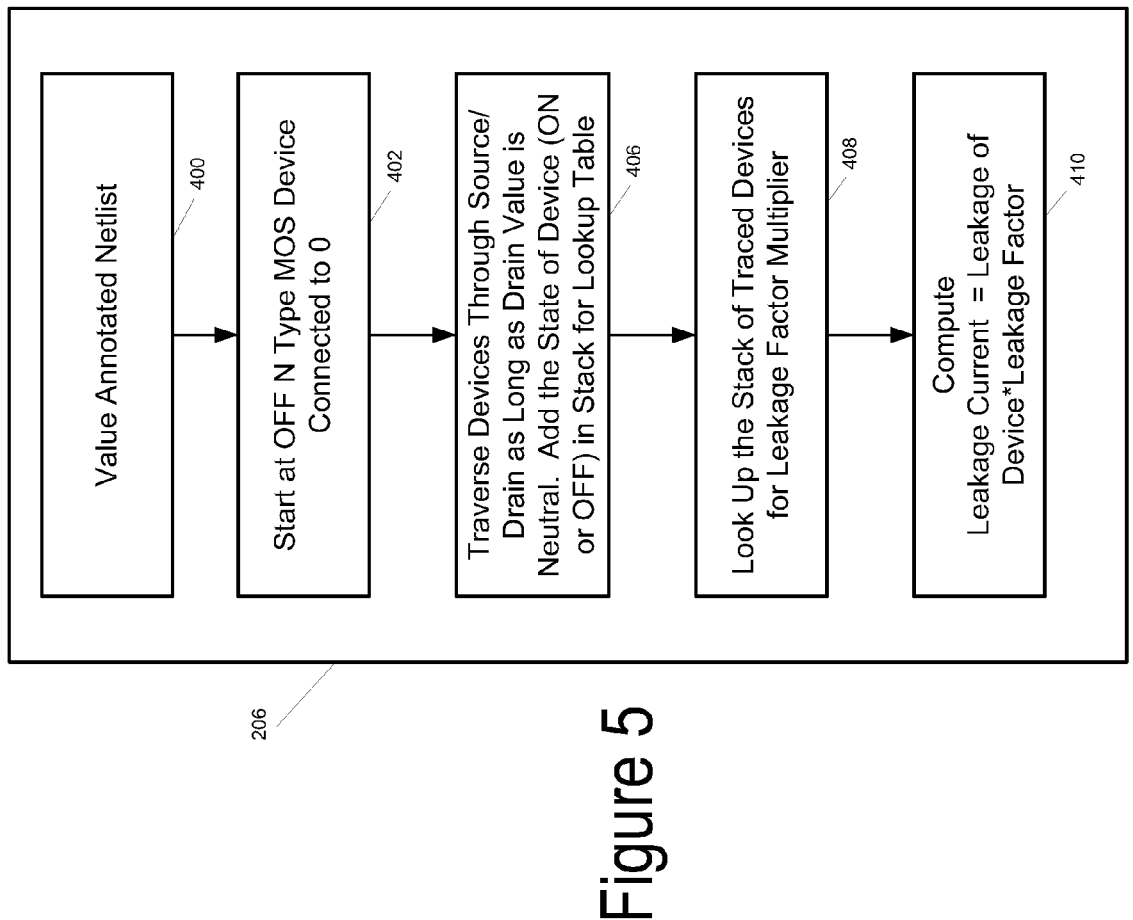
FIG. 5 is a flowchart depicting the process of determining which devices are in an OFF state and performing the leakage factor lookup function.

FIG. 5 illustrates the process of step 206 in FIG. 2. In step 400, the annotated netlist has values assigned to each node. In step 402 the analysis starts with an N-type or N channel MOS device that is in an OFF state and which is connected to a node having a 0 value, that is, a propagated ground value or a logic 0 value. Step 402 also starts at OFF P-type or P channel MOS devices which are connected to a node having a logic 1 value and proceeds to step 406 wherein the devices are also traversed through the source/drain connections as long as the drain values are neutral (i.e., neither a 1 nor a 0). In step 408, the leakage factor multiplier for the stack of devices is then determined. Lastly, in step 410, the leakage current is computed. The total leakage is calculated by multiplying the device width, the state leakage factor per device as dictated by stack position and applied bias factor, and the associated leakage per micron of device width. Thus, LVT devices would have a significantly higher leakage per micron than RVT devices. PFET and NFET device leakage can be independently addressed as each device type and implant have separate leakage currents.

FIG. 6 illustrates a leakage factor lookup table. This table is used to provide the leakage factor for devices in the OFF state in a particular circuit path. The location of a device in the off state along with the number of other devices in that path that are in the OFF state determine this leakage factor. In addition, the assigned value at the devices source and drain nodes are used to determine this leakage factor. However, consideration must be given to the fact that NFET and PFET devices do not pass voltage potentials in the same manner. For example, a logic 1 value applied to an NFET whose gate is ON would result in the passing of a logic value of only 0.09. Likewise, PFET connected to ground or logic 0 and whose gate is in the ON state would pass a logic value 0.1. Therefore, these nodes logic values are used in the logic factor lookup table of FIG. 6 along with the device circuit positions to determine the leakage factor. It should be noted that the 0.9 and 0.1 values to represent the weak logic 1 and weak logic 0, respectively, are not actual voltage values, but are just a means to recognize stack configuration and applied drain-source bias. Values of 0.8 and 0.7 are also used for deeper stack recognition. The table of FIG. 6 is organized in three distinct columns: Node voltage, Device Circuit Positions and Leakage Factor. The node voltage is that value which is applied to the Drain of the transistor stack. The device circuit positions list the devices in the stack associated with their state as a function of position. Lastly, the leakage factor is the scalar adjustment for the leakage current of the OFF device.

In order to understand the operation of the leakage current calculator invention, a simple example of a two input NAND gate is provided. FIGS. 7A, 7B, 7C and 7D are schematics of this two input NAND gate. In FIG. 7A, the two inputs A and B=0. Therefore, PFET 500 and PFET 502 are both ON and NFET 504 and NFET 506 are OFF. Since both PFET 500 and 502 are ON, the voltage potential VDD=1 is passed to the Output node. Leakage current occurs in transistors that are in the OFF state. Since both 504 and 506 are OFF, node C has a value of −1. Using the lookup table in FIG. 6 for two OFF devices with a node voltage of 1.0, it is determined that the leakage factor is 0.125.

Figure 7B:
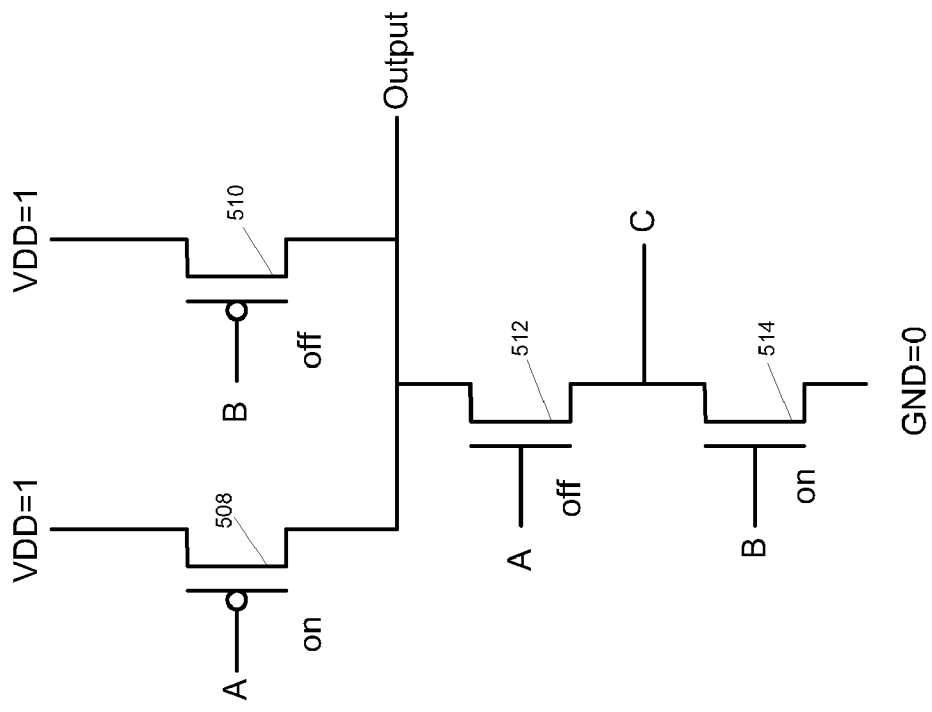
FIGS. 7A, 7B, 7C and 7D are schematic diagrams of a NAND CMOS circuit.
Figure 7A:
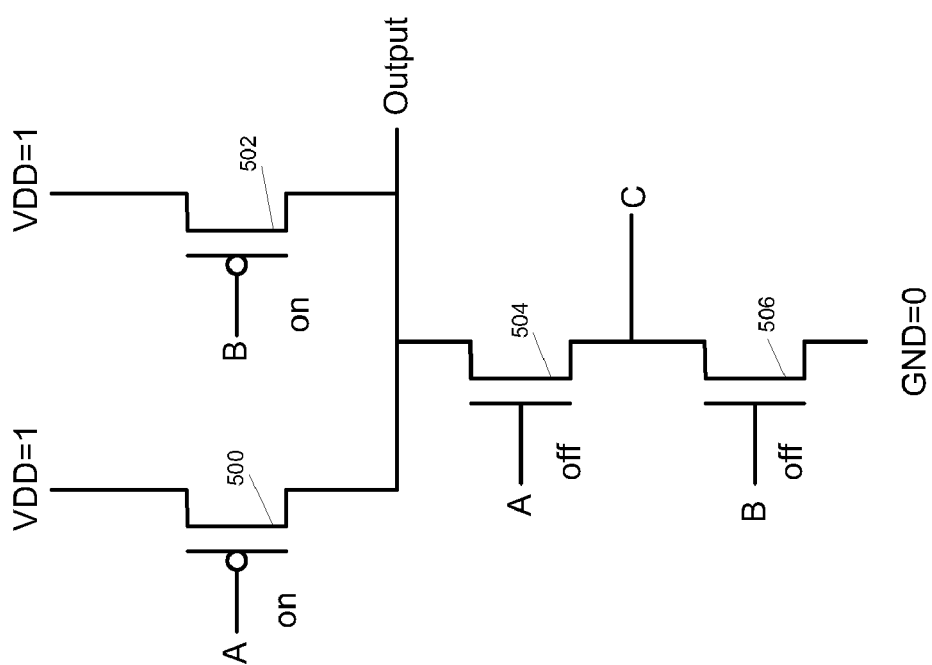

Referring to FIG. 7B, A=0 and B=1 and PFET transistor 508 is in an ON state, NFET transistor 512 is an OFF state, PFET transistor 510 is an OFF state and NFET transistor 514 is in an ON state. A logic 1 is passed to the Output node through PFET 508. A logic 0 is passed to node C since NFET transistor 514 is in an ON state. Again, the leakage factor table of FIG. 6 determines that the leakage factor is 1.0.

Figure 7D:
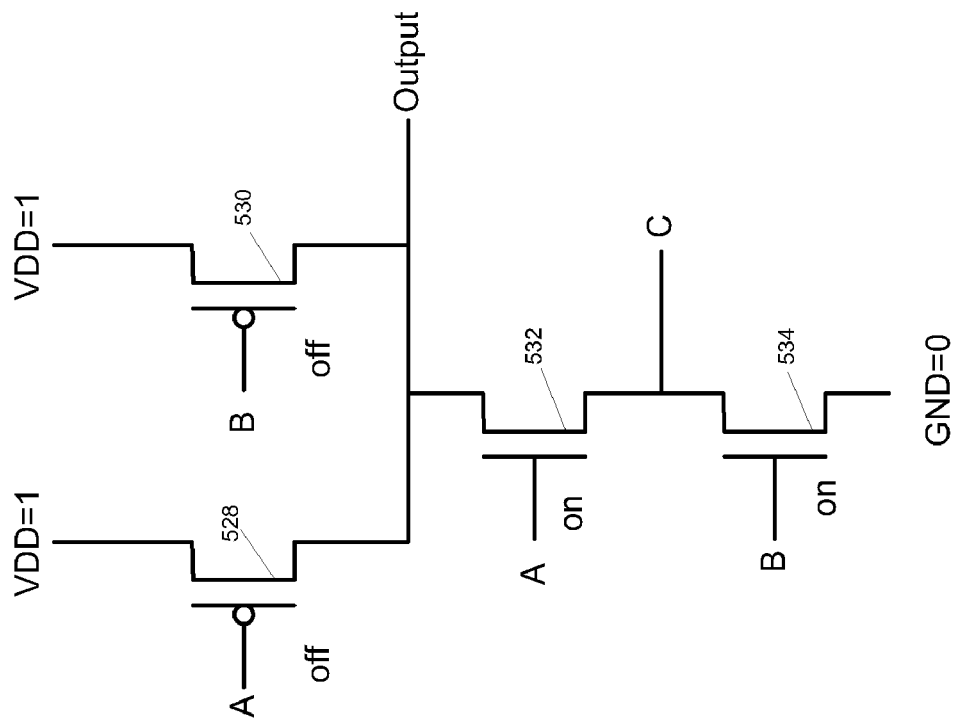
Figure 7C:
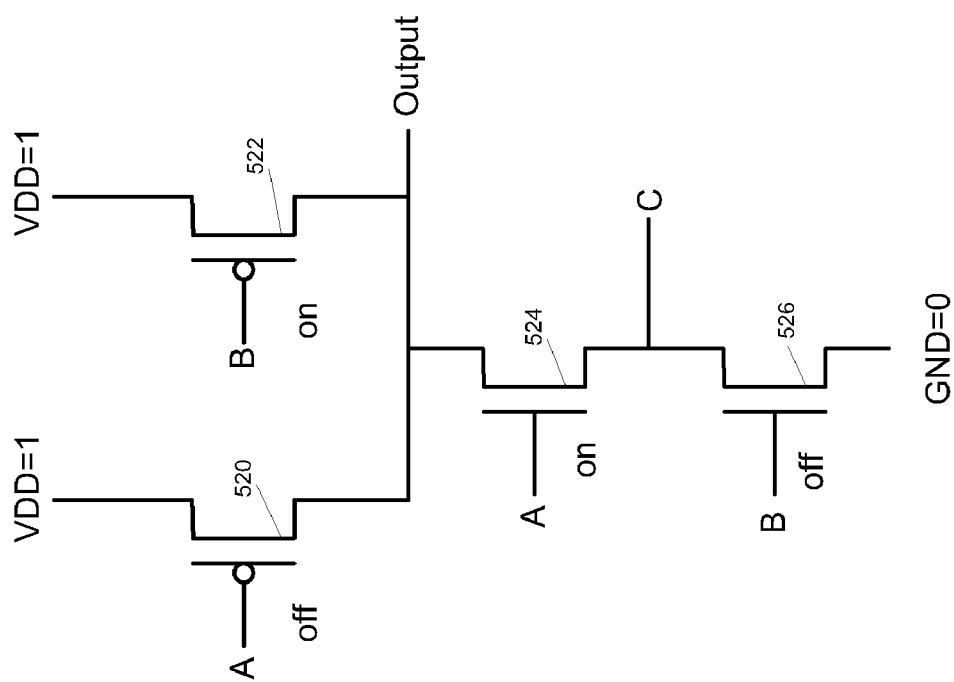

Referring to FIG. 7C, the input A=1 and the input B=0. Therefore, the PFET 520 is OFF, the PFET at 522 is ON, NFET 524 is ON, and NFET 526 is OFF. As in the examples of FIGS. 7A and 7B, the Output node is at a logic 1 value since, in this case, PFET 522 is ON. However, the logic 1 value is degraded to a logic 0.9 when passed through the ON NFET 524 to node C. Again, accessing the leakage factor table of FIG. 6, it is determined that the leakage factor is 0.764.

Lastly, and FIG. 7D, both A and B=1. Therefore, PFETs 528 and 530 are both OFF and NFETs 532 and 534 are both ON. Since both NFETs are ON, the ground zero potential is passed to the Output node. Using the leakage factor table of FIG. 6, it is determined that the leakage factor is 1.0. However, since both PFETs 528 and 530 are OFF, the total leakage has to be added for both resulting in a leakage factor of 2.0. Table 2 below illustrates the resulting leakage factors for the different two input NAND gate input signal configurations. The average leakage factor for all four states is equal to 0.972.

TABLE 2

| Input State Weight in percentage | Input A | Input B | Circuit Output | Resulting Leakage Factor |
|---|---|---|---|---|
| 25% | 0 | 0 | 1 | 0.125 |
| 25% | 0 | 1 | 1 | 1.000 |
| 25% | 1 | 0 | 1 | 0.764 |
| 25% | 1 | 1 | 0 | 2.000 |

It should now be understood that determining the leakage factor and resulting leakage current are important considerations when determining which device is to be a RVT device or a LVT device. The proper design would place the LVT device in the circuit location with a smaller current leakage factor for the desired the performance objective.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method performed in a data processing system for determining leakage current in a CMOS circuit having a plurality of devices comprising the steps of:
   reading netlist data from a data processing system memory containing information on each of the plurality of devices and their respective connections within the circuit;
   reading a plurality of input state data from said data processing system memory, each input state specifying input signals provided to the circuit;
   determining which devices in the circuit are in an OFF state for each of the plurality of input states;
   computing leakage current for only those devices that are in the OFF state and do not have the same source and drain voltage; and
   providing to a data processing system display resulting leakage information for each input state.

2. The method according to claim 1 wherein said netlist information includes for each device, device type, device characteristics including at least threshold voltage type.

3. The method according to claim 1 wherein the reading the input state data step includes the step of reading weighted input information.

4. The method according to claim 1 wherein said determining step includes a further a step of initially setting each voltage supply connection of the circuit to its assigned voltage supply value from the netlist, each ground connection to its assigned ground potential value from the netlist and all other nodes not directly connect to the input signals to a logic neutral value.

5. The method according to claim 4 further including a step of simulating circuit operation by traversing the circuit devices according to their position in the circuit with each input signal data to determine which devices in the circuit are ON or OFF.

6. The method according to claim 5 wherein said simulating step further includes the step of determining the voltages at each node in the circuit.

7. The method according to claim 6 wherein said simulating step further includes the step of propagating the source logic value to the drain logic value for those devices that are in an ON state.

8. The method according to claim 1 wherein the reading input state data step furthers includes a step of generation input state data if no input state data is provided.

9. The method according to claim 1 wherein said providing resulting leakage information step included providing leakage information for each device.

10. A method performed in a data processing system for determining leakage current in a CMOS circuit having a plurality of devices comprising the steps of:
    reading netlist data from a data processing system memory containing information on each of the plurality of devices and their respective connections within the circuit;
    reading a plurality of input state data from said data processing system memory, each input state specifying input signals provided to the circuit;
    reading input state weight data specifying occurrence information for individual input signal data;
    determining which devices in the circuit are in an OFF state for each of the plurality of input states;
    computing leakage current for each device in the OFF state according to the device position in the circuit for each of the plurality of input states and the input state weight data; and
    providing to a data processing system display resulting leakage information for each input state.

11. A method performed in a data processing system for determining leakage current in a CMOS circuit having a plurality of devices comprising the steps of:
    reading netlist data from a data processing system memory containing information on each of the plurality of devices and their respective connections within the circuit;
    reading a plurality of input state data from said data processing system memory, each input state specifying input signals provided to the circuit;
    determining which devices in the circuit are in an OFF state for each of the plurality of input states;
    computing leakage current for each device in the OFF state according to the device position in the circuit for each of the plurality of input states and by combining any two devices that have the same source and drain connections if the devices are either both ON or OFF and replacing the two devices with a single device having a sum of their channel widths; and
    providing to a data processing system display resulting leakage information for each input state.

12. A computer program product stored in a computer operable non-transitory media, the computer operable non-transitory media containing instructions for execution by a computer, which, when executed by the computer, cause the computer to implement a method for determining leakage current in a CMOS circuit having a plurality of devices, the method comprising the steps of:
    reading netlist data containing information on each of the plurality of devices and their respective connections within the circuit;
    reading a plurality of input state data, each input state specifying input signals provided to the circuit;
    determining which devices in the circuit are in an OFF state for each of the plurality of input stat;
    computing leakage current for only each device in the OFF state according to the device position in the circuit for each of the plurality of input states and that do not have the same source and drain; and
    providing resulting leakage information for each input state.

13. The computer program according to claim 12 wherein said netlist information includes for each device, device type, device characteristics including at least threshold voltage type.

14. The computer program according to claim 12 wherein said determining step includes a further a step of initially setting each voltage supply connection of the circuit to its assigned voltage supply value from the netlist, each ground connection to its assigned ground potential value from the netlist and all other nodes not directly connect to the input signals to a logic neutral value.

15. The computer program according to claim 14 further including a step of simulating circuit operation by traversing the circuit devices according to their position in the circuit with each input signal data to determine which devices in the circuit are ON or OFF.

16. The computer program according to claim 12 wherein the reading input state data step furthers includes a step of generation input state data if no input state data is provided.

17. A computer program product stored in a computer operable non-transitory media, the computer operable non-transitory media containing instructions for execution by a computer, which, when executed by the computer, cause the computer to implement a method for determining leakage current in a CMOS circuit having a plurality of devices, the method comprising the steps of:
    reading netlist data containing information on each of the plurality of devices and their respective connections within the circuit;
    reading a plurality of input state data, each input state specifying input signals provided to the circuit;
    determining which devices in the circuit are in an OFF state for each of the plurality of input state;
    computing leakage current for each device in the OFF state according to the device position in the circuit for each of the plurality of input states and by combining any two devices that have the same source and drain connections if the devices are either both ON or OFF and replacing the two devices with a single device having a sum of their channel widths; and
    providing resulting leakage information for each input state.

18. A data processing system comprising:
    a keyboard;
    a display;
    a processor connected to the keyboard and the display and including an execution unit and a program memory containing a program method for determining leakage current in a CMOS circuit having a plurality of devices, the program method comprising the steps of:

reading netlist data containing information on each of the plurality of devices and their respective connections within the circuit;

reading a plurality of input state data, each input state specifying input signals provided to the circuit;

determining which devices in the circuit are in an OFF state for each of the plurality of input state;

computing leakage current only for each device in the OFF state according to the device position in the circuit for each of the plurality of input states and that do not have the same source and drain; and providing resulting leakage information for each input state.

\* \* \* \* \*